E. C. WRIGHT.
DIRECT CURRENT TURBO-GENERATOR.
APPLICATION FILED NOV. 30, 1906.
957,290. Patented May 10, 1910.
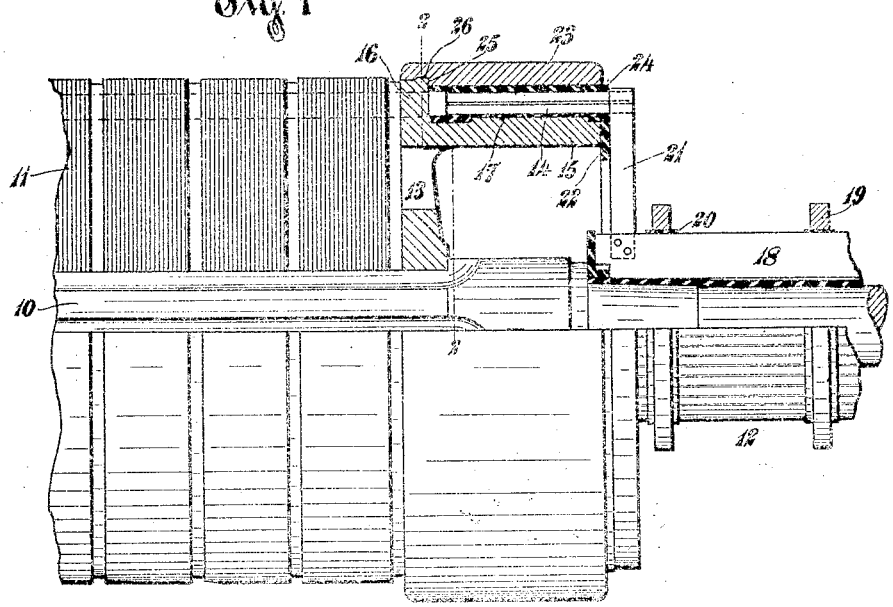
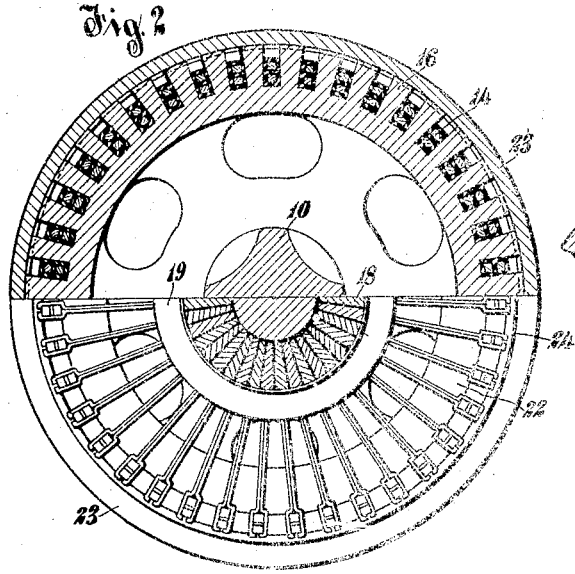
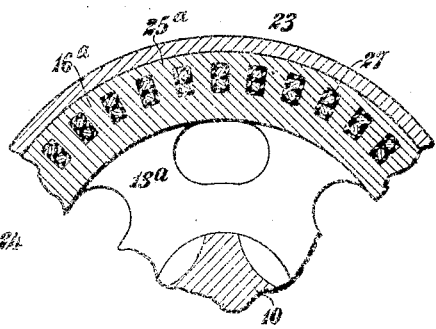
Witnesses
Inventor
Edwin C. Wright
By
Attorney

UNITED STATES PATENT OFFICE.

EDWIN C. WRIGHT, OF NEWPORT, KENTUCKY, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DIRECT-CURRENT TURBO-GENERATOR.

957,290.

Specification of Letters Patent. Patented May 10, 1910.

Application filed November 30, 1906. Serial No. 345,599.

*To all whom it may concern:*

Be it known that I, EDWIN C. WRIGHT, citizen of the United States, residing at Newport, in the county of Campbell and State of Kentucky, have invented certain new and useful Improvements in Direct-Current Turbo-Generators, of which the following is a full, clear, and exact specification.
My invention relates to dynamo-electric machines and particularly to high speed machines of the direct current type, such as direct current turbo-generators.

In a high speed machine it is necessary to provide means for holding in position the portions of the coils which project beyond the ends of the core, so that the coils can not be injured or displaced by centrifugal action. It has been proposed to surround the coils by heavy rings or bands made from some strong material such as phosphor bronze. When rings are employed for this purpose, it is necessary to provide some means for supporting, centering and retaining the rings in position.

In direct current machines considerable difficulty has been experienced in providing adequate supporting and protecting means for the coils at the commutator end of the armature for the reason that on account of the commutator necks or leads connecting the coils to the commutator bars, it is a difficult matter to provide proper means for retaining the coil retaining and protecting ring in position. Accordingly band wires have usually been relied upon for retaining the projecting portions of the coils in position. This latter expedient is not suitable for all types of machines, particularly large high speed machines, for the reason that at high peripheral speeds the band wires are in danger of breaking loose and wrecking the machine.

The object of my invention is to provide improved means for securing and retaining in position rings for the portions of the coils which project beyond the ends of the cores of dynamo-electric machines, particularly at the commutator ends of armatures of direct-current machines.

In carrying out my invention I place the ring in position over the coils preferably when hot and permit the ring to contract so that the engaging faces of the ring and a suitable support consisting preferably of the end member at the end of the core interlock.

In another aspect my invention consists of a rotary member of a dynamo-electric machine comprising a core, an end member, coils carried by the core and extending beyond the end thereof and a ring surrounding the coils and resting on the end member, said ring and end member having interlocked or interfitting engaging faces.

For a better understanding of my invention reference is had to the accompanying drawings in which—

Figure 1 is a partial sectional elevation of a high speed direct current armature equipped with my invention; Fig. 2 is a transverse sectional elevation of the same, the section being taken approximately along the line 2—2 of Fig. 1; and Fig. 3 is a section similar to the section of Fig. 2 showing a slight modification.

Referring now to the figures of the drawing, I have shown at 10 a shaft on which is mounted the core 11 and commutator 12. The core consists of laminæ held between end-members, one of which is shown at 13. The armature is provided with a winding having portions 14 which project beyond the core and rest upon a shoulder or bracket 15 which extends outward from the end-member 13. The end-member is also provided with a flange 16 through which the coils of the winding pass. In Figs. 1 and 2 the flange is provided with open slots for the windings. The coils are separated from the shoulder or bracket 15 by insulation 17.

The bars 18 of the commutator are held in position by a plurality of shrink-rings 19 separated from the bars by insulation 20. The commutator bars are connected to the ends 14 of the coils, which extend a short distance beyond the bracket 15, by radial commutator leads or necks 21. These leads or necks are preferably riveted and soldered to the bars and soldered to the ends of the coils. The leads or necks are separated from the end of the bracket 15 by insulation 22.

Surrounding the projecting portions or ends 14 of the coils is a rigid ring or band 23 for preventing displacement and injury to the coils. The ring rests on the flange 16 of the end-member and on a ring or shield of insulation 24 inclosing the projecting ends of the coils. Unless means are provided for securing the ring firmly in position there is considerable danger of a shifting or displacement of the same in an axial direction, particularly if the machine rotates at high speeds.

My improved method and means for securing the ring in position will now be described. According to my invention the engaging faces of the ring and flange of the end-member are interlocked, that is one of said members is provided with a ridge or shoulder which engages the other member so as to prevent a displacement of the ring. In this instance the flange 16 of the end-member is provided with a ridge or shoulder 25 and the ring 23 is provided with a shoulder 26 which rests against the side of the flange and with a groove of the same internal contour as the ridge 25 on the flange. As is seen the ridge 25 fits closely within the groove of the ring. The ring is placed in the position shown by contracting the same after it is slipped over the coils. This is preferably done by first heating the ring until it expands a sufficient degree to permit the end of the ring to be slipped over the ridge or shoulder 25, and then permitting the ring to cool and to contract so as to tightly grip the flange with the ridge or shoulder 25 of the flange located in the correspondingly shaped groove in the ring.

The size of the groove and shoulder of the ring and flange depends upon the co-efficient of expansion of the ring, the diameter of the ring, and the degree to which the ring can be safely heated without injuring the insulation inclosing the coils. Since all these conditions are known the ring and end-member can be so machined as to obtain an excellent fit between the ring and end-member, and in all cases the ring can be expanded a sufficient amount to permit the use of interfitting or interlocking parts of ample size to prevent any danger of displacement of the ring.

In Fig. 3 I have shown a slight modification. In this case the flange 16ᵃ of the end-member 13ᵃ is provided with holes 27 through which the conductors of the windings extend, and with a continuous or unbroken shoulder or ridge 25ᵃ which fits into the corresponding groove in the ring.

I do not wish to be confined to the exact details shown or described as many slight changes can be made without departing from the spirit and scope of my invention.

What I claim as new and desire to secure by Letters Patent is:—

1. In a rotor for a dynamo-electric machine, a core, an end member therefor provided with a radial flange adjacent to the core, coils carried by said core and projecting beyond the end thereof through openings in said flange, and a ring surrounding the flange and the projecting portions of the coils, said ring and flange having interlocked parts which prevent axial movement of the ring.

2. In a rotor of a dynamo-electric machine, a slotted core, an end-member therefor, coils carried in the slots of said core and projecting beyond the end thereof through openings in said end-member, a ring surrounding the projecting portions of the coils and resting on said end-member, and means for retaining said ring on said end-member comprising a ridge or shoulder on one of said parts.

3. In a rotor of a dynamo-electric machine, a slotted laminated core, an end-member therefor, coils carried in the slots of said core and projecting beyond the end thereof through openings in said end-member, and a ring surrounding the projecting portions of the coils and resting on said end member, said ring and end-member having interfitting parts which maintain the ring in position.

4. In the rotor of a dynamo-electric machine, a core, an end-member therefor having a circumferentially projecting annular ridge and an axially projecting annular shoulder, a ring having an internal annular groove with which said ridge engages, and coils carried by said core and having projecting ends clamped between said ring and said shoulder.

5. In the rotor of a dynamo-electric machine, a slotted core, an end-member therefor having a circumferentially projecting annular ridge, coils in the slots of the core and having ends projecting beyond the core through said end member, and a rigid ring surrounding said projecting ends and provided with an internal groove with which said ridge engages, said ridge having an outer diameter which is less than the inner diameter of the ring save when the latter is at a higher temperature than the end-member.

6. In the rotor of a dynamo-electric machine, a slotted core, an end-member therefor, coils carried in the slots of said core and projecting beyond the core through said end member, and a rigid ring surrounding said projecting ends, said ring and said end-member having a ridge and a groove which interlock, the diameters of the ridge and groove being such that the ring and end-member will clear when one is at a higher temperature than the other, and will be firmly fastened together when at the same temperature.

7. In a rotor of a dynamo-electric machine, a core, an end member therefor provided with a radial flange adjacent to the core, coils carried by said core and projecting beyond the end thereof through openings in said flange, and a ring surrounding the flange and the projecting portions of the coils, said ring and flange having parts which interlock to prevent axial movement between the ring and flange when the two are at the same temperature, but allow such axial movement when the parts are at different temperatures.

8. In a rotor of a dynamo-electric machine, a core, an end member having a radial flange adjacent to the core and an axially projecting annular shoulder, coils carried by said core and extending through openings in said flange, and a ring surrounding the coils, flange, and shoulder and clamping the coils against the shoulder, said ring and flange having interlocked parts which prevent axial movement of the ring.

In testimony whereof I affix my signature, in the presence of two witnesses.

EDWIN C. WRIGHT.

Witnesses:
GEO. B. SCHLEY,
FRED J. KINSEY.